United States Patent
Brady

(10) Patent No.: US 9,537,438 B2
(45) Date of Patent: Jan. 3, 2017

(54) BUSS POTENTIAL ISOLATION MODULE

(71) Applicant: Cummins Power Generation, IP, Inc., Minneapolis, MN (US)

(72) Inventor: Brian B. Brady, Minneapolis, MN (US)

(73) Assignee: Cummins Power Generation, IP, Inc., Minneapolis, MN (US)

( * ) Notice: Subject to any disclaimer, the term of this patent is extended or adjusted under 35 U.S.C. 154(b) by 52 days.

(21) Appl. No.: 14/594,555

(22) Filed: Jan. 12, 2015

(65) Prior Publication Data

US 2016/0204723 A1   Jul. 14, 2016

(51) Int. Cl.
*H02P 11/00* (2006.01)
*H02H 7/06* (2006.01)
*H02P 9/00* (2006.01)
*H02P 9/04* (2006.01)
*F02D 29/06* (2006.01)

(52) U.S. Cl.
CPC ...................... *H02P 9/04* (2013.01)

(58) Field of Classification Search
USPC .............. 322/19, 28, 44; 290/40 C
See application file for complete search history.

(56) References Cited

U.S. PATENT DOCUMENTS

| | | | |
|---|---|---|---|
| 3,437,971 A | 4/1969 | Mikulecky | |
| 3,596,115 A * | 7/1971 | Conzelmann | H01J 29/023 257/555 |
| 4,384,245 A * | 5/1983 | Metter | H02J 7/1446 322/28 |
| 4,798,998 A * | 1/1989 | Hemphill | H05B 41/3922 315/210 |
| 5,321,308 A * | 6/1994 | Johncock | H02P 9/30 174/DIG. 15 |
| 5,446,682 A * | 8/1995 | Janke | G01R 31/1272 324/500 |
| 5,821,755 A * | 10/1998 | Henze | H02J 7/0029 320/DIG. 10 |
| 5,903,116 A * | 5/1999 | Geis | H02P 9/04 318/140 |
| 6,693,778 B1 * | 2/2004 | Pittman | G01R 31/343 361/20 |
| 6,788,031 B2 * | 9/2004 | Pendell | H02P 9/30 322/44 |
| RE40,713 E * | 5/2009 | Geis | H02P 9/04 318/140 |

(Continued)

FOREIGN PATENT DOCUMENTS

EP   2 381 453   10/2011

*Primary Examiner* — Pedro J Cuevas
(74) *Attorney, Agent, or Firm* — Foley & Lardner LLP

(57) ABSTRACT

A genset includes a generator configured to generate a power signal having a first voltage. A controller is configured to monitor and control at least one operational parameter of the generator. A buss potential isolation module is configured to receive the power signal having the first voltage from the generator, reduce the first voltage to output a second voltage, and communicate the power signal having the second voltage to the controller. The second voltage is suitable for communicating to the controller which can include electronic circuitry configured to meet an NEC Class 2 circuit requirement. The first voltage can be at least 120 volts, and the second voltage can be less than 24 volts.

28 Claims, 4 Drawing Sheets

(56) References Cited

U.S. PATENT DOCUMENTS

| | | | | |
|---|---|---|---|---|
| 7,598,751 B2* | 10/2009 | Collins, Jr. | G01R 19/2513 | 324/649 |
| 7,719,866 B2* | 5/2010 | Boldo | G05F 1/67 | 323/282 |
| 7,847,424 B2* | 12/2010 | Murugesan | F01K 15/02 | 290/40 B |
| 8,030,905 B2* | 10/2011 | Petkov | H02P 9/02 | 322/44 |
| 8,054,050 B2* | 11/2011 | Murugesan | F01K 15/02 | 290/40 B |
| 8,362,789 B2* | 1/2013 | Collins, Jr. | G01R 19/2513 | 324/649 |
| 8,363,439 B2* | 1/2013 | Yang | H02M 1/4258 | 363/89 |
| 8,797,773 B2* | 8/2014 | George | H02M 3/3376 | 363/17 |
| 9,209,732 B2* | 12/2015 | Radan | B63H 23/24 | |
| 9,362,753 B2* | 6/2016 | Kitchin | H04M 19/005 | |
| 9,386,648 B2* | 7/2016 | Fassbender | H05B 33/0845 | |
| 2003/0094929 A1* | 5/2003 | Pendell | H02K 17/42 | 322/44 |
| 2004/0263110 A1* | 12/2004 | Pendell | H02P 9/30 | 318/794 |
| 2007/0024257 A1* | 2/2007 | Boldo | G05F 1/67 | 323/282 |
| 2008/0036472 A1* | 2/2008 | Collins | G01R 19/2513 | 324/649 |
| 2009/0262562 A1* | 10/2009 | Yang | H02M 1/4258 | 363/84 |
| 2010/0007312 A1* | 1/2010 | Petkov | H02P 9/02 | 322/44 |
| 2010/0026317 A1* | 2/2010 | Collins, Jr. | G01R 19/2513 | 324/649 |
| 2012/0051094 A1* | 3/2012 | George | H02M 3/3376 | 363/17 |
| 2013/0033796 A1 | 2/2013 | Shea | | |
| 2014/0320092 A1* | 10/2014 | Radan | B63H 23/24 | 322/19 |
| 2015/0039913 A1* | 2/2015 | Sugiyama | G06F 1/28 | 713/300 |
| 2016/0139548 A1* | 5/2016 | Kosaka | G03G 15/2039 | 399/67 |
| 2016/0165691 A1* | 6/2016 | Fassbender | H05B 33/0845 | 315/149 |
| 2016/0198541 A1* | 7/2016 | Tikkanen | H05B 33/0803 | 315/201 |

* cited by examiner

BUSS POTENTIAL ISOLATION MODULE

TECHNICAL FIELD

The present disclosure relates generally to generator sets (gensets) for supplying electrical power.

BACKGROUND

Gensets are used extensively for power generation in locomotives, trucks, recreational vehicles), marine vessels as well as for grid power generation. Gensets normally include a prime mover such as an internal combustion engine which converts fossil fuel into mechanical energy to rotate a generator which converts it into useable electrical energy at a line voltage and frequency most suitable for transmission and utilization. The voltage and frequency are two of the most critical operational parameters of a genset's output and they must be monitored and controlled, usually by a digital microcontroller. Voltage signals from generators' outputs must be safely and accurately communicated to the controller for it to maintain stable output from the generator set.

Normal industrial line voltages in the United States are a nominal 480 volts AC which is extremely hazardous to touch and must be enclosed to guard against accidental contact in contrast to modern microcontrollers that operate at very low (5 volts or less) DC levels. In addition, the electrical power circuits and busses into which such gensets are wired can often deliver extremely high currents into short circuits which can produce dangerous arc flashes when an electrical fault occurs. Such currents and flashes can vaporize wiring causing lethal blast injuries to personnel performing routine maintenance operations on the genset or measuring output voltages and load. Therefore it is mandatory to provide adequate isolation between the high AC output voltages inside the generator enclosure and the low microcontroller levels or personnel access port.

Historically gensets used sets of three potential transformers to step output voltages produced by a genset down to the levels a controller or service personnel could safely utilize. However, such potential transformers tend to be relatively large and expensive, adding to both the cost of the generator set's control package and the volume of the enclosure where they are mounted. Alternatively, passive voltage dividers have also been used, but they must dissipate significant power in the form of heat and can require more space than a potential transformer.

SUMMARY

One embodiment relates to a genset including a generator configured to generate an output power signal having a first voltage. A controller is configured to monitor and control at least one operational parameter of the generator. A buss potential isolation module is configured to receive the power signal having the first voltage from the generator, reduce the first voltage to output a second voltage, and communicate the power signal having the second voltage to the controller. In particular embodiments, the controller includes electronic circuitry which is configured to meet a National Electric Code (NEC) Class 2 circuit requirement, and the second voltage is suitable for communicating to the electronic circuitry to meet the NEC Class 2 circuit requirement. The first voltage can be at least 120 volts and the second voltage can be less than 24 volts.

In another embodiment, a buss potential isolation module includes a housing defining an internal volume. A voltage divider circuit is disposed in the internal volume. The voltage divider circuit is configured to receive a power signal having a first voltage from a generator, reduce the first voltage to output a second voltage, and communicate the signal having the second voltage to a controller. The controller includes electronic circuitry configured to operate at the second voltage. In particular embodiments, the electronic circuitry can be configured to meet a NEC Class 2 circuit requirement, and the second voltage is suitable for communicating to the electronic circuitry to meet the NEC Class 2 circuit requirement.

In some embodiments, the generator includes an enclosure defining an internal volume and opening defined on a sidewall of the enclosure. In such embodiments, the voltage divider circuit includes an input lead and the housing is configured to be mounted on the sidewall of the enclosure such that the input lead is disposed through the opening into the internal volume of the enclosure. Moreover, the input lead is configured to be electrically coupled to the generator.

In yet another embodiment, a buss potential isolation module includes a plurality of high impedance leads configured to receive a power signal having a first voltage from a generator, reduce the first voltage to output a second voltage, and communicate the power signal having the second voltage to a controller. The controller includes electronic circuitry configured to operate at the second voltage. In a particular embodiment, the electronic circuitry is configured to meet a NEC Class 2 circuit requirement, and the second voltage is suitable for communicating to the electronic circuitry to meet the NEC Class 2 circuit requirement. In one embodiment, the high impedance leads include spark plug leads.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
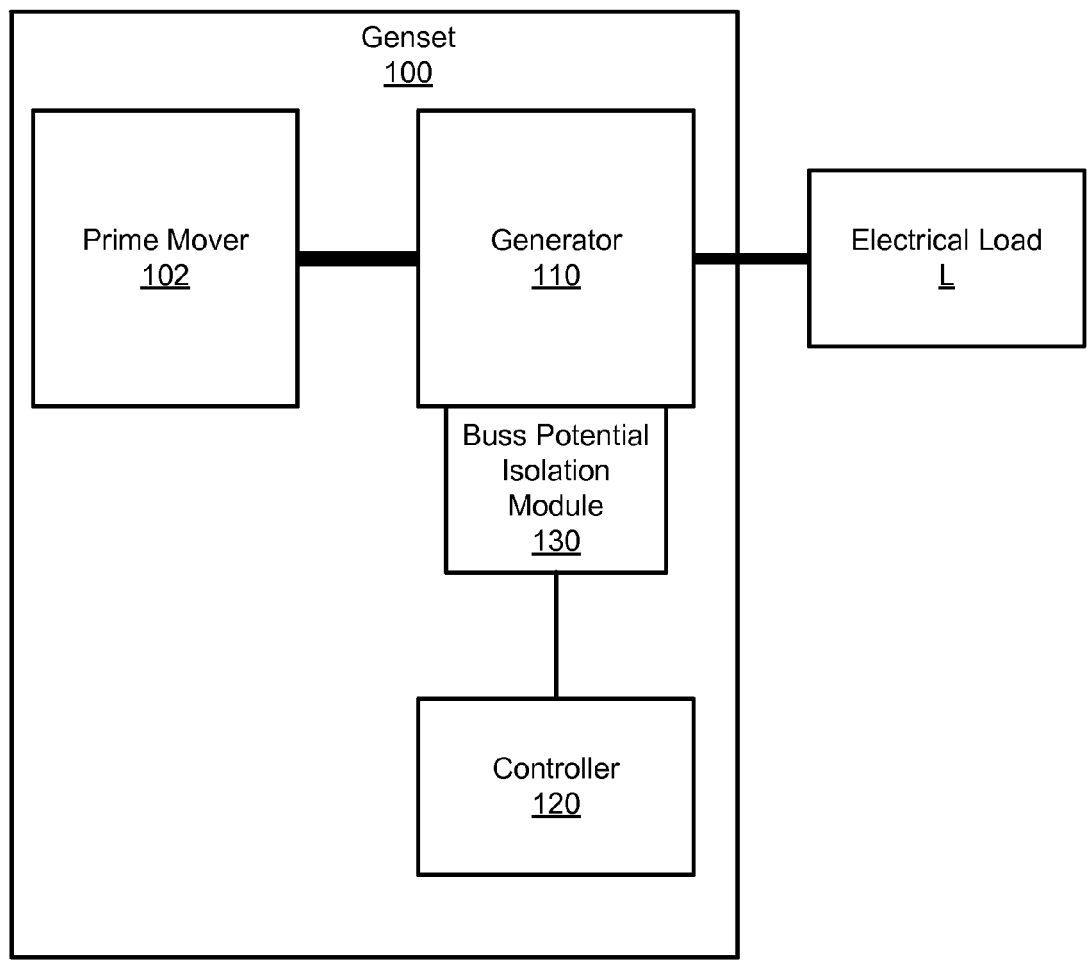
FIG. 1 is a schematic block diagram of a genset that includes a buss potential isolation module, according to an exemplary embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to generator sets (gensets), such as internal combustion (IC) engine based generator sets, for supplying electrical power, and in particular to gensets that include a buss potential isolation module.

As used herein, the term "buss potential isolation module" is used to describe an electronic module which is configured to reduce a line output voltage from an alternator or otherwise generator of a genset to voltage which is safe for access by service or maintenance personnel.

Embodiments described herein may provide several benefits including, for example: (1) reducing a power signal having a hazardously high first voltage (e.g., at least 120 volts to 480 volts) produced by a generator to output the power signal having a safely lower second voltage (e.g., less than 120 volts) suitable for communicating to a controller, allowing designers and installers greater flexibility in routing and installing circuitry without being limited by safety and regulatory restrictions; (2) reducing voltage by using commercially available high impedance leads or electronic circuitry thereby, reducing cost; (3) packaging the buss potential isolation module in a small package suitable for mounting on a housing of the generator, thus minimizing space requirements; and/or (4) enabling coupling with any genset without requiring any substantial modification to the genset.

FIG. 1 shows a schematic block diagram of a generator set 100, according to an embodiment. The generator set 100 includes a prime mover 102, a generator 110, a controller 120, and a buss potential isolation module 130. The generator set 100 is electrically coupled to an electrical load L and configured to produce a power a signal having a first voltage to be communicated to the load L.

The generator set 100 includes a primary mover 102 that converts a fossil fuel into mechanical energy and an electric power generator 110. The prime mover 102 can, for example, include an IC engine that has at least one piston disposed in at least one cylinder. In some embodiments, the prime mover 102 can be a four stroke engine. In one embodiment, the prime mover 102 can include a diesel powered engine with fuel injection and compression ignition. In other embodiments, the prime mover 102 can be a four stroke spark ignition engine, a two stroke engine or a rotary type engine (e.g., a Wankel rotary engine) and may or may not include fuel injection. In such embodiments, the prime mover 102 may be powered by gasoline, ethanol, natural gas, kerosene oil, liquid petroleum gas, hydrogen, propane, any other suitable fuel source or a combination thereof (e.g., a gasoline-ethanol mixture).

The generator 110 can convert the rotational mechanical power into electrical energy. In some embodiments, the alternator can be mechanically coupled to the engine by a mechanical linkage that can provide a desired turn ratio, a torque converter, a transmission, any other form of rotary linking mechanism or a combination thereof. Generator 110 can also include a fuel cell assembly or any other generator of electrical power.

The generator 110 is configured to generate the power signal having the first voltage. Furthermore, the generator 110 can also include a switch gear assembly. The switch gear can include fuses, circuit breakers, or other electrical components to control, protect, and isolate electrical equipment, for example, the electrical load L.

The generator 110 can be configured to generate a power signal having first voltage. The first voltage can have a potentially hazardous line voltage level, for example, at least 120 volts. The first voltage can be above a threshold voltage level (e.g., about 120 volts) associated with a risk of injury, for example, severe or otherwise fatal electric shocks to users. In some embodiments, the first voltage can have a magnitude of at least about 480 volts. For example, the first voltage can have a magnitude of about 480 volts, 500 volts, 600 volts, 700 volts, 800 volts, or even higher. The first voltage is be suitable for transmitting to and driving the electrical load L but is unsuitable for direct communicating to electronic equipment which requires a lower safe voltage to reduce hazards and prevent damage to equipment. Such electronic equipment can include equipment configured or otherwise classified to meet a NEC Class 2 or any other low voltage circuit requirement (e.g., operate a voltage of less than 24 volts), for example, the controller 120.

The electrical load L is configured to receive the power signal having the first voltage. The load L can include any suitable machinery which can be operated at the first voltage. Such machinery can include industrial or consumer electrical grids (e.g., standby power, rental power, or power management applications), industrial equipment, excavation equipment, (e.g., cranes, bulldozers, etc.), or locomotives, trucks, automobiles, recreational vehicles), line voltage output marine vessels, or any other machinery.

The controller 120 is configured to monitor and control at least one operational parameter of the generator in response to the first voltage. The controller 120 includes electronic circuitry configured interface with a safe, lower voltage and non-hazardous replication of the first voltage. The second voltage level can be below a threshold voltage level associated with a risk of injury. For example, the electronic circuitry can be configured to operate with low voltage signals normally less than 24 volts. In particular embodiments, the electronic circuitry included in the controller 120 can be configured to meet a NEC Class 2 circuit requirement. The controller 120 can include a processor (e.g., a microcontroller), and one or more sensors to measure the operational parameters of the generator 110. Such operational parameters can include, for example, voltage and/or current produced by the generator 110, signal noise, etc.

The buss potential isolation module 130 is electrically coupled to the controller 120. Furthermore, in the illustrated embodiment, the buss potential isolation module 140 is electrically coupled to the generator 110 in parallel with the load L such that the voltage drop across the buss potential isolation module 130 and the load L is substantially the same. The buss potential isolation module 130 is configured to receive the power signal having the first voltage from the generator 110. In one embodiment, the first voltage can be at least 120 volts.

The buss potential isolation module 130 is configured to reduce the first voltage to output a second voltage, and communicate the power signal having the second voltage to the controller 120. For example, the second voltage can be less than 24 volts (e.g., in the range of about 3 volts to about 5 volts). In this manner, the buss potential isolation module 130 reduces the first voltage to the second voltage which is safe for operating the controller 120. In various embodiments, the second voltage provided by the buss potential isolation module 130 is externally accessible, enabling access by service personnel or coupling of test equipment.

Furthermore, the buss potential isolation module 130 can prevent fault currents and/or arc flash energy from reaching the controller 120, nearby personnel, or passing through electrical leads communicating the second voltage to the controller 120, thereby protecting the controller 120 from damage and personnel from potential injury. The buss potential isolation module 130 can also protect personnel operating the controller 120 or performing maintenance operations on the generator set 100 proximal to the controller 120 from fault currents and/or arc flash energy which can cause lethal blasts. Moreover, the buss potential isolation module 130 can allow external access to the reduced second voltage by service personnel or test equipment.

Figure 2:
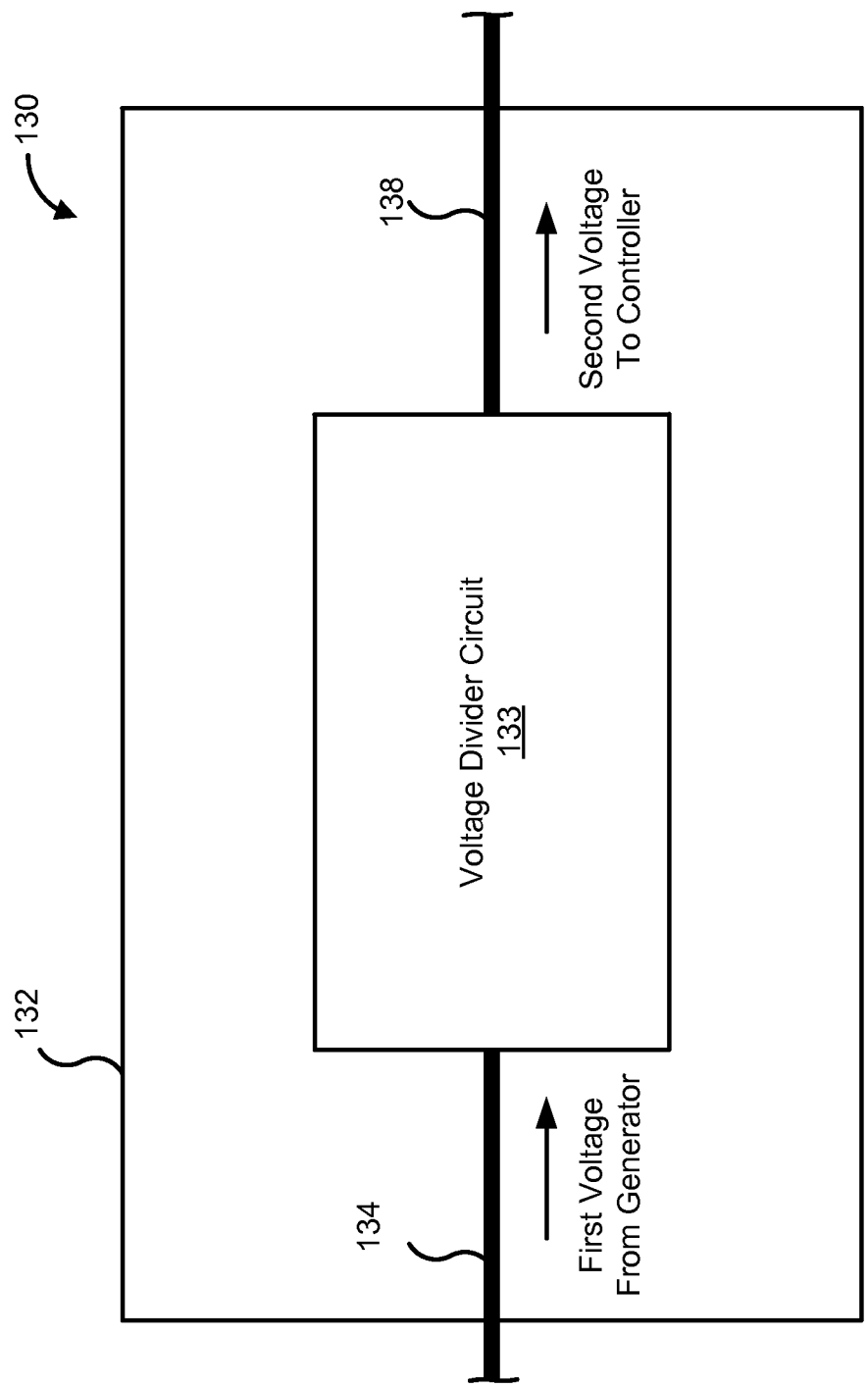
FIG. 2 is a schematic block diagram of the buss potential isolation module included in the genset of FIG. 1.

Referring also now to FIG. 2, the buss potential isolation module 130 can include a housing 132 defining an internal volume. A voltage divider circuit 133 is disposed in the internal volume. An input lead 134 and an output lead 138 are electrically coupled to the voltage divider circuit 133.

The housing 132 can be a pre-molded or fabricated housing, having a compact form factor to minimize space required in the generator set 100. The housing 132 can be configured to be disposed on the generator 110. For example, the housing 132 can be bolted on an enclosure of an alternator, or a switchgear included in the generator 110. Furthermore, the housing 132 can be removably coupled to the generator 110. For example, the housing 132 can be bolted on the generator 110, screwed, snap-fit, or otherwise coupled using harnesses. In some embodiments, the generator 110 can include an enclosure (e.g., an enclosure of the alternator or switchgear) defining an internal volume and an opening defined on a sidewall of the enclosure. In some such embodiments, the housing 132 can be configured to be mounted on the side wall of the enclosure. The input lead 134 can be disposed through the opening into the internal volume of the enclosure and configured to be electrically coupled to the generator 110.

In some embodiments, the housing 132 can include a conduit nipple (not shown). The conduit nipple can be configured to be disposed through the opening in the sidewall of the enclosure of the generator 110. The conduit nipple can be configured to allow the input lead 134 to be communicated through the opening into the internal volume defined by the enclosure. The conduit nipple may also be configured to couple the housing 132 to the enclosure.

The voltage divider circuit 133 is configured to receive the power signal having the first voltage from the generator 110. The input lead 134 is configured to be electrically coupled to an electrical outlet of the generator 110 and communicate the first power signal having the first voltage from the generator 110 to the voltage divider 133. In some embodiments, the input lead 134 can be electrically coupled to an output of the generator 110, an input of the load L, or a coupling between the two. While shown as including a single input lead 134, a plurality of input leads can be included in the buss potential isolation module 130. Each input lead can be configured to communicate the first voltage from the generator 110 to the voltage divider circuit 133 (e.g., from various poles of an alternator, or various banks of a switchgear included in the generator 110).

The voltage divider circuit 133 is configured to reduce the hazardously high first voltage to output a safe lower second voltage, and communicate the power signal having the second voltage to the controller 120, or an external access terminal, via an output lead 138. The second lower voltage is suitable for communicating to the controller 120. For example, the second voltage can be less than about 24 volts which greatly reduces the complexity and cost of wiring required for communicating the second voltage. In particular embodiments, the second voltage is suitable for communicating to the electronic circuitry to meet the NEC Class 2 circuit requirement.

In some embodiments, the voltage divider circuit 133 can include a plurality of resistors in series. In other embodiments, the voltage divider circuit 133 can include any other suitable electronic components such as, for example, resistive dividers, capacitive dividers, isolation transformers, optical transformers, and/or floating circuitry. The voltage divider circuit 133 can include off the shelf electronic components and can, for example, include solid state electronic components.

The voltage divider circuit 133 can be substantially potted in the internal volume defined by the housing 132. In other words, the internal volume of the housing 132 can be filled or otherwise packed with a solid or gelatinous material which can protect the voltage divider circuit 133 from vibrations or shock, moisture, and/or corrosive agents commonly present in and around generator sets. Furthermore, the potting material can provide enhanced electrical insulation to prevent short circuits, and provide more efficient heat transfer. Suitable potting materials can include thermosetting plastics, silicone rubber gels, polyurethane, etc.

In some embodiments, the buss potential isolation module 130 can also include surge arrestors and/or transient suppressors. In still other embodiments, the buss potential isolation module 130 can include signal processing circuitry for filtering signal noise from the first voltage, such that the second voltage is substantially free from the noise. In other embodiments, any other suitable microprocessor can also be included in the buss potential isolation module 130. The microprocessor can, for example, be configured to measure the first voltage, measure the second voltage, activate or deactivate the buss potential isolation module 130 to connect or disconnect the generator 110 from the controller 120 if the first voltage and/or the second voltage exceeds a predetermined threshold, or perform monitoring and/or control functions.

In some embodiments, the buss potential isolation module 130 can include a plurality of high impedance leads which form part of the voltage divider circuit 133. In this way most of the power dissipation is distributed along the length of the lead rather than being concentrated in the module enclosure. The high impedance leads can be configured to receive the power signal having the first high hazardous voltage from the generator 110 and reduce the first voltage to output a safe lower second voltage which is communicated to the controller 120. The second voltage is suitable for further local voltage division or direct communication to the controller 120 inputs which only need to operate with lower voltages, which could be less than 24 volts. In particular embodiments, the second voltage can be suitable for communicating the electronic circuitry to meet the NEC Class 2 circuit requirement.

The high impedance leads can have a suitable impedance and length such that most of the first voltage drops across the entire length of the high impedance leads to yield the second voltage. For example, the high impedance leads can have an impedance of greater than about 10,000 Ohms per foot of the high impedance leads (e.g., about 11,000 Ohms per foot, 12,000 Ohms per foot, 13,000 Ohms per foot, 14,000 Ohms per foot, or about 15,000 Ohms per foot inclusive of all ranges and values therebetween). Furthermore, depending on the size of the generator and its enclosure, the length of the high impedance leads can about 1 foot, 2 feet, 3 feet, 4 feet, or even higher. In some embodiments, the high impedance leads can include wire such as used for spark plug leads. In other embodiments, the high impedance leads can include any suitable leads, or have a plurality of impedances (e.g., resistors) disposed along a length of the leads. In such embodiments, the input voltage can drop across each of the plurality of impedances to yield the output voltage, while at the same time distributing the voltage drop and resulting power dissipation across a larger physical distance to aid in arc prevention. A portion of the high impedance leads can be disposed inside the internal volume defined by the housing 132.

In some embodiments, the high impedance leads can be used in combination with the voltage divider circuit 133. For example, the high impedance leads can be electrically coupled with the voltage divider circuit 133 such that a combination of the voltage divider circuit 133 and the high impedance leads is configured to reduce the first voltage to the second voltage. For example, the input lead 134 show in FIG. 2 can include a high impedance lead as described herein. Furthermore, the output lead 138 can also include a high impedance lead.

Figure 3:
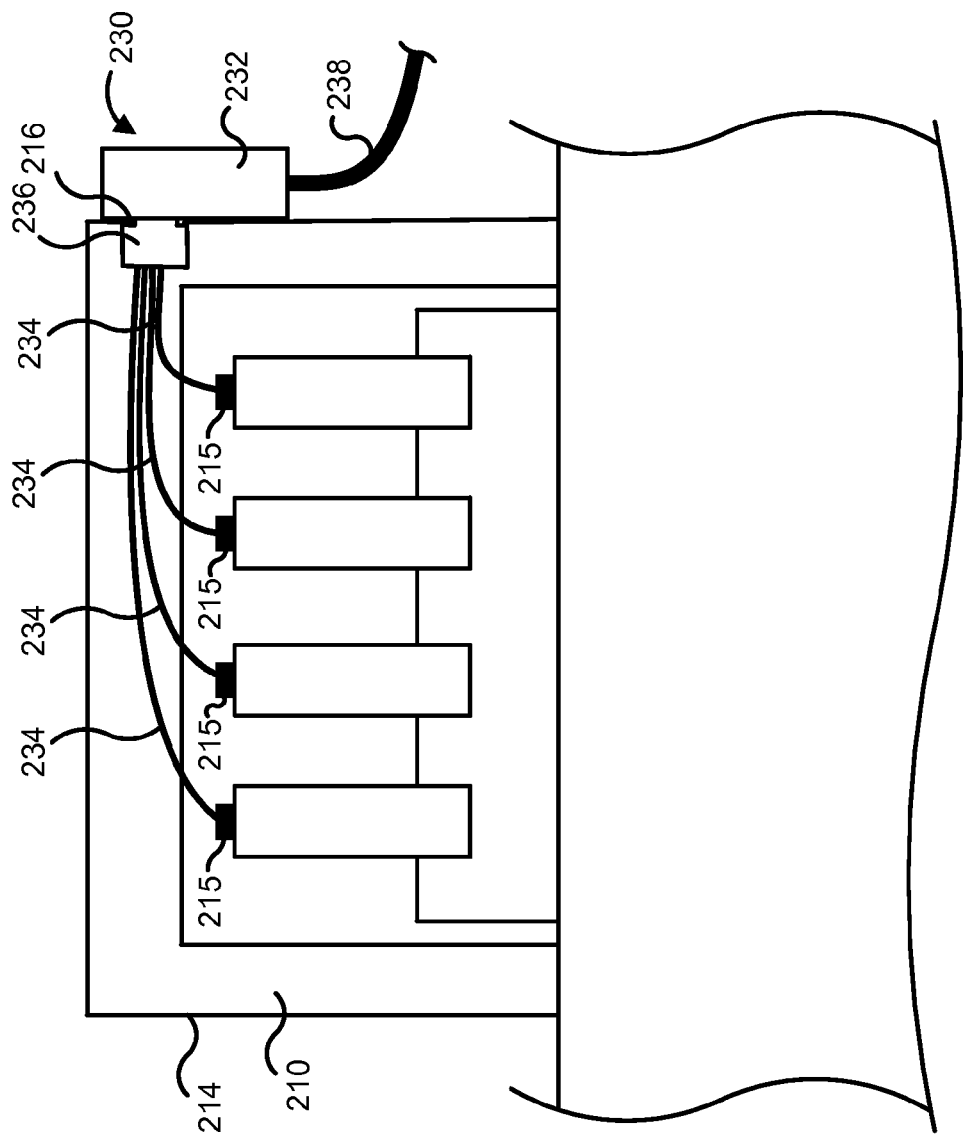
FIG. 3 is a cut away side view of a buss potential isolation module mounted through the sidewall of a generator enclosure, according to an exemplary embodiment.

FIG. 3 is a side view of a buss potential isolation module 230 that includes a voltage divider circuit. The buss potential isolation module 230 can be included in a generator set, for example, the generator set 100, or any other generator set described herein.

The buss potential isolation module 230 is disposed on a generator 210. The generator 210 is configured to generate a power signal having a first voltage which is communicated to a load (not shown), for example, the electrical load L as described herein with respect to the generator set 100, and the buss potential isolation module 230. The generator 210 can include an IC engine (e.g., a diesel engine) coupled to an alternator (not shown). The generator 210 includes an enclosure 214 that defines an internal volume. An opening 216 is defined on a sidewall of the enclosure 214 to allow electrical coupling with the buss potential isolation module 230, as described herein. The generator 210 can include fuses, circuit breakers, or other electrical components disposed inside the internal volume defined by the enclosure 214, which can be configured to control, protect, and isolate electrical equipment, for example, the load.

The generator 210 can be configured to produce the power signal having the first. The first voltage can have a potentially hazardous line voltage level, for example, at least 120 volts. In some embodiments, the first voltage can have a magnitude of at least about 480 volts. For example, the first voltage can have a magnitude of about 480 volts, 500 volts, 600 volts, 700 volts, 800 volts, or about 900 volts, inclusive of all ranges and values therebetween. This first voltage is suitable for communicating to the load but unsuitable for directly communicating to electronic equipment which operate at lower safe voltages (e.g., electronic equipment that meet the NEC Class 2 circuit requirement such as the controller 120 or any other controller described herein).

The buss potential isolation module 230 can be electrically coupled to a controller (e.g., the controller 120 described herein) in series. Furthermore, the buss potential isolation module 230 can be electrically coupled to the generator 210 in parallel such that the voltage drop across the buss potential isolation module 230 is substantially the same as the voltage drop across the load. In other words, the buss potential isolation module 230 is configured to receive the power signal having the first voltage from the generator 210 inside a housing 232 of the buss potential isolation module 230.

The housing 232 defines an internal volume. The housing 232 is disposed on the sidewall of the enclosure 214 proximate to the opening 216. The housing 232 can be removably coupled to the enclosure 214. For example, the housing 232 can be bolted, screwed, snap-fit, or coupled using a harness to the enclosure 214. The housing 232 can be premolded, have a compact form factor, and formed form a light weight material (e.g., aluminum or plastics).

The buss potential isolation module 230 also includes a conduit nipple 236 disposed through the opening 216, for example, screwed through the opening 216. The conduit nipple 236 is configured to allow a plurality of input leads 234 of the buss potential isolation module 230 to be communicated through the opening 216 into the internal volume defined by the enclosure 214. In this manner, the input leads 234 can be electrically coupled to the generator 210. For example, the input leads 234 can be electrically coupled to a line voltage output 215 of the generator 210 (e.g., line voltage output from a plurality of buss bars included in the generator 210), as shown in FIG. 3. In some embodiments, the conduit nipple 236 can also serve to couple the housing 232 to the enclosure 214. The through wall mounting configuration of the buss potential isolation module 230 eliminates additional electrical components, reduces the internal volume of the housing 232, and can advantageously use contact with a sidewall of the enclosure 314 for dissipating heat.

The buss potential isolation module 230 includes a voltage divider circuit (not shown) disposed in the internal volume defined by the housing 232. The voltage divider circuit is configured to receive the first signal having the first voltage (e.g., about 120 volts) from the generator 210 via the input leads 234. The voltage divider circuit is configured to reduce the first voltage to output a second voltage, and communicate the power signal having the second voltage through the sidewall to the controller outside the housing 232 via an output lead 238. In particular embodiments, the controller can include electronic circuitry configured to meet the NEC Class 2 circuit requirement and the second voltage can be suitable (e.g., safe) for communicating to the electronic circuitry to meet the NEC Class 2 circuit requirement or to render it safe for external connection by service personnel or test equipment. For example, the second voltage can be less than about 24 volts (e.g., in the range of about 3 volts to about 5 volts). The controller can include the controller 130, or any other controller described herein, and is configured to monitor and control at least one operational parameter of the generator 210.

In some embodiments, the voltage divider circuit can include a plurality of resistors in series. In other embodiments, the voltage divider circuit can include any other suitable electronic components such as, for example, resistive dividers, capacitive dividers, isolation transformers, optical transformers, varistors, and/or floating circuitry. In still other embodiments, the buss potential isolation module 230 can include signal processing circuitry for filtering signal noise from the first voltage, such that the second voltage is substantially free from the noise.

The voltage divider circuit can include off the shelf electronic components and can, for example, include solid state electronic components. In some embodiments, the buss potential isolation module 230 can also include surge arrestors and/or transient suppressors as are commonly known in the arts. In other embodiments, a microprocessor, for example, a PLC chip, an ASIC chip, or any other suitable microprocessor can also be included in the buss potential isolation module 230. The microprocessor, for example, can be configured to measure the first voltage, activate or deactivate the buss potential isolation module 230 to connect or disconnect from the generator 210 from the controller if the first voltage exceeds a predetermined threshold, or perform monitoring and/or control functions. Furthermore, the buss potential isolation module 230 can be in series with the controller such that the controller receives the power signal having the second voltage from the buss potential isolation module 230 via the output lead 238. In this manner, any fault currents and/or arc flash energy can be prevented from travelling through the output lead 238 and/or reaching the controller which can damage the controller or cause lethal blasts which can harm exposed personnel.

In some embodiments, the voltage divider circuit can be substantially potted in the internal volume defined by the housing 232. In other words, the internal volume of the housing 232 can be filled or otherwise packed with a solid or gelatinous material which can protect the voltage divider circuit from vibrations or shock, moisture, and corrosive agents. Furthermore, the potting material can provide electrical insulation to prevent short circuits, and provide efficient heat transfer. Suitable potting materials can include thermosetting plastics, silicone rubber gels, polyurethane, etc.

Figure 4:
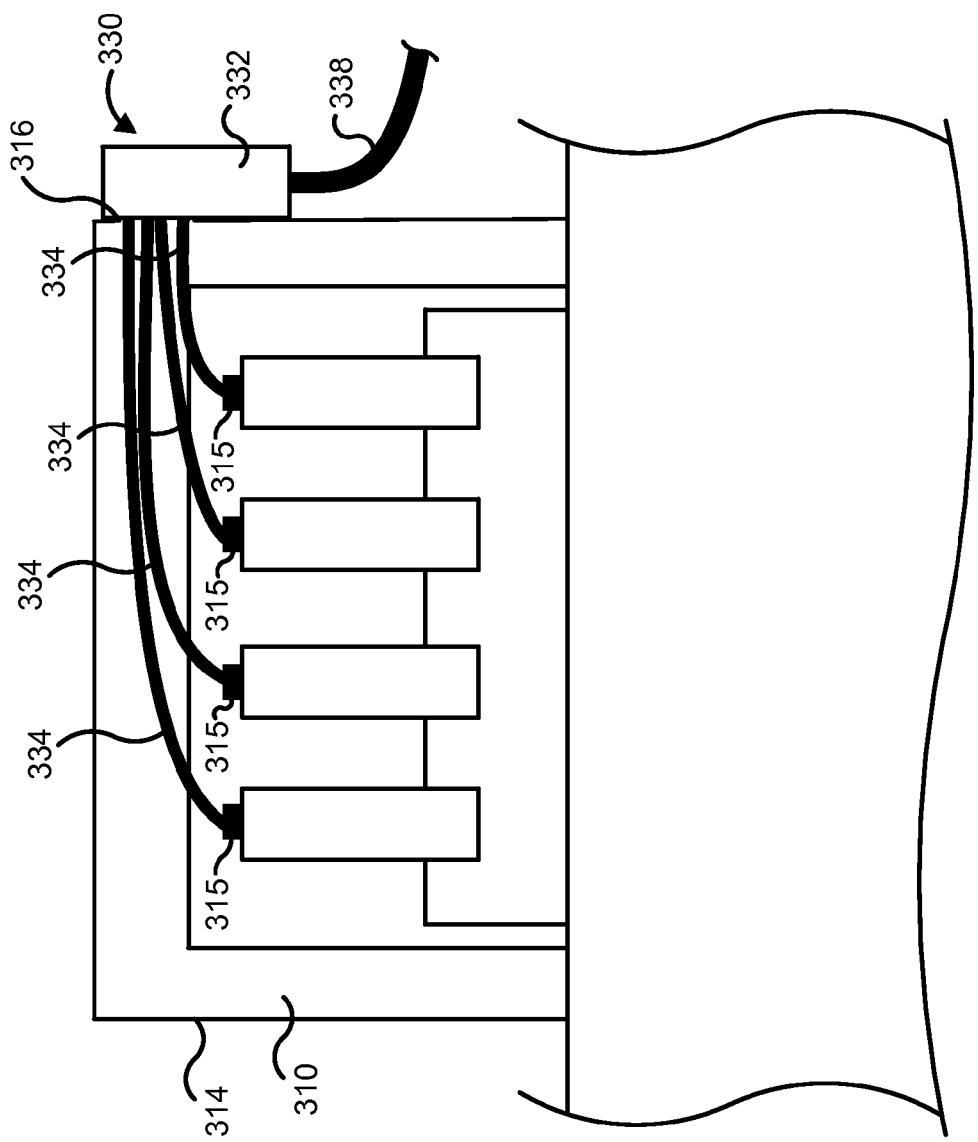
FIG. 4 is another cutaway side view of a buss potential isolation module mounted through the sidewall of a generator enclosure, according to another exemplary embodiment.

In some embodiments, a buss potential isolation module can include a plurality of high impedance leads. FIG. 4 is a side view of a buss potential isolation module 330. The buss potential isolation module 330 can be included in a genset, for example, the genset 100, or any other genset described herein.

The buss potential isolation module 330 is disposed on a generator 310. The generator 310 is configured to produce a power signal having a first voltage which is communicated to a load (not shown), for example, the electrical load L as described herein with respect to the generator set 100. In some embodiments, the generator 310 can include an IC engine (e.g., a diesel engine) coupled to an alternator (e.g., a permanent magnet alternator). The generator 310 includes an enclosure 314 that defines an internal volume. An opening 316 is defined on a sidewall of the enclosure 314. The generator 310 can include fuses, circuit breakers, or other electrical components disposed inside the internal volume defined by the enclosure 314, which can be configured to control, protect, and isolate electrical equipment, for example, the load.

The generator 310 can be configured to produce the power signal having the first voltage. The first voltage can have a potentially hazardous line voltage level, for example, at least 120 volts. In some embodiments, the first voltage can have a magnitude of at least about 480 volts. For example, the first voltage can have a magnitude of about 480 volts, 500 volts, 600 volts, 700 volts, 800 volts, or about 900 volts, inclusive of all ranges and values therebetween. This voltage is suitable for communicating to the load but unsuitable for directly communicating to electronic equipment which operate at lower safe voltages (e.g., electronic equipment that meet the NEC Class 2 circuit requirement such as the controller 120 or any other controller described herein).

The buss potential isolation module 330 can be electrically coupled to a controller (e.g., the controller 120 described herein) in series. Furthermore, the buss potential isolation module 330 can be electrically coupled to the generator 310 in parallel such that the voltage drop across the buss potential isolation module 330 is substantially the same as the voltage drop across the load. In other words, the buss potential isolation module 330 is configured to receive the power signal having the first voltage from the generator 310.

The buss potential isolation module 330 includes a plurality of high impedance leads 334 electrically coupled to the generator 310. For example, the high impedance leads 334 can be electrically coupled to a line voltage output 315 of the generator 310 (e.g., line voltage output from a plurality of buss bars included in the generator 310), as shown in FIG. 4. The high impedance leads 334 can be configured to receive the power signal having the first voltage from the generator 310. The high impedance leads can be further configured to reduce the first voltage to output a second voltage suitable for communicating to the controller. The high impedance leads 334 are further configured to communicate the power signal having the second voltage to the controller. In particular embodiments, the second voltage can be suitable for communicating to electronic circuitry included in the controller which meets an NEC Class 2 circuit requirement.

High impedance leads can reduce the number of components required as well as power dissipation of such components in the internal volume of a housing 332 of the buss potential isolation module 330. This can allow the buss potential isolation module 330 to have a smaller form factor, be less expensive, and operate under high temperature conditions.

In some embodiments, the high impedance leads 334 can include spark plug leads. In other embodiments, the high impedance leads 334 can include any suitable leads which include a plurality of impedances disposed along a length of the leads. The high impedance leads 334 can have a substantially high impedance which is sufficient to reduce the first voltage to the second voltage. For example, the high impedance leads 334 can have an impedance of greater than about 10,000 Ohms per foot of the high impedance leads (e.g., about 11,000 Ohms per foot, 12,000 Ohms per foot, 13,000 Ohms per foot, 14,000 Ohms per foot, or about 15,000 Ohms per foot inclusive of all ranges and values therebetween). Furthermore, the high impedance leads 334 can have any suitable length to facilitate the reduction of the first voltage to the second voltage. For example, the high impedance leads 334 can have a length of about 1 feet, 2 feet, 3 feet, 4 feet, or even more.

The housing 332 defines an internal volume and is disposed on the sidewall of the enclosure 314 of the generator 310 that includes the opening 316. The housing 332 can be substantially similar to the housing 232 described with respect to the buss potential isolation module 230. At least a portion of the high impedance leads 334 distal to the generator 310 can be disposed through the opening 316 into the internal volume defined by the housing. 332 In some embodiments, the high impedance leads 334 can be electrically coupled within the housing 334 to a single output lead 338 for communicating the power signal having the second voltage to the controller. The output lead 338 can be formed from the same material as the high impedance leads 334, for example, spark plug wire. In other embodiments, the housing 332 is not included in the buss potential isolation module 330. In such embodiments, the high impedance leads 334 can be electrically coupled directly with the controller.

In some embodiments, a conduit nipple (not shown) can also be disposed through the opening 316. Each of the high impedance leads 334 can be disposed through a channel defined by the conduit nipple. The conduit nipple can be used to secure the high impedance leads 334, and/or enable coupling of the housing 332 with the enclosure 314.

In some embodiments, a voltage divider circuit can also be disposed in the internal volume defined by the housing 332. The voltage divider circuit can be electrically coupled to the high impedance leads 334 such that a combination of the high impedance leads 334 and the voltage divider circuit is configured to reduce the first voltage to the second voltage. The voltage divider circuit can be substantially similar to the voltage divider circuit 133, described with respect to buss potential isolation module 130, or the voltage divider circuit described with respect to the buss potential isolation module 230 and is therefore, not described in further detail herein.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. A genset, comprising:
   a generator configured to generate an output voltage having a first voltage level;
   a controller configured to monitor and control at least one operational parameter of the generator; and
   a buss potential isolation module configured to receive the output voltage having the first voltage level from the generator, and reduce the first voltage level to output a voltage having a second voltage level to the controller for operating the controller at the second voltage level.

2. The genset of claim 1, wherein the first voltage level is above a threshold voltage level associated with a risk of injury, and wherein the second voltage level is below the threshold voltage level.

3. The genset of claim 1, wherein the first voltage level is at least 120 volts.

4. The genset of claim 3, wherein the first voltage level is above a threshold voltage level associated with a risk of injury.

5. The genset of claim 1, wherein the second voltage level is less than 24 volts.

6. The genset of claim 5, wherein the second voltage level is below a threshold voltage level associated with a risk of injury.

7. The genset of claim 5, wherein the second voltage level is in the range of about 3 volts to about 5 volts.

8. The genset of claim 1, wherein the buss potential isolation module includes a voltage divider circuit.

9. The genset of claim 8, wherein the buss potential isolation module includes a plurality of resistors in series.

10. The genset of claim 1, wherein the buss potential isolation module includes a plurality of high impedance leads configured to reduce the output voltage having the first voltage level to the voltage having the second voltage level.

11. The genset of claim 10, wherein each of the plurality of high impedance leads has an impedance of greater than 10,000 ohms per feet.

12. The genset of claim 10, wherein the high impedance leads include a plurality of impedances along a length of the leads.

13. The genset of claim 10, wherein the high impedance leads include spark plug lead wire.

14. A buss potential isolation module, comprising:
    a housing defining an internal volume;
    a voltage divider circuit disposed in the internal volume, the voltage divider circuit configured to receive an output voltage having a first voltage level from a generator, reduce the first voltage level to output a voltage having a second voltage level to a controller for operating the controller at the second voltage level.

15. The buss potential isolation module of claim 14, wherein the first voltage level is above a threshold voltage level associated with a risk of injury, and wherein the second voltage level is below the threshold voltage level.

16. The buss potential isolation module of claim 14, wherein the generator includes an enclosure defining an internal volume and an opening defined on a sidewall of the enclosure, the voltage divider circuit comprising:
    an input lead,
    wherein, the housing is configured to be mounted on the sidewall of the enclosure such that input lead is disposed through the opening into the internal volume of the enclosure, the input lead configured to be electrically coupled to the generator.

17. The buss potential isolation module of claim 16, wherein the housing includes a conduit nipple, the conduit nipple configured to be disposed through the opening to allow the input lead to be communicated through the opening into the internal volume defined by the enclosure.

18. The buss potential isolation module of claim 14, wherein the voltage divider circuit is substantially potted in the internal volume.

19. The buss potential isolation module of claim 14, wherein the voltage divider circuit comprises a plurality of resistive dividers.

20. The buss potential isolation module of claim 19, wherein the voltage divider circuit comprises at least one of capacitive dividers, isolation transformers, optical transformers, and floating circuitry.

21. A buss potential isolation module, comprising:
    a plurality of high impedance leads, the high impedance leads configured to receive an output voltage having a first voltage level from a generator, reduce the first voltage level to output a voltage having a second voltage level to a controller or an external access terminal for operating the controller at the second voltage level.

22. The buss potential isolation module of claim 21, wherein the first voltage level is above a threshold voltage level associated with a risk of injury, and wherein the second voltage level is below the threshold voltage level.

23. The buss potential isolation module of claim 21, wherein the high impedance leads include spark plug leads.

24. The buss potential isolation module of claim 21, wherein the high impedance leads include a plurality of impedances disposed along a length of the leads.

25. The buss potential isolation module of claim 21, further comprising:
a housing defining an internal volume, the plurality of high impedance leads disposed in the internal volume; and
a voltage divider circuit disposed in the internal volume and electrically coupled to the high impedance leads,
wherein, the voltage divider circuit and the high impedance leads are configured to reduce the first voltage to the second voltage.

26. A genset, comprising:
a generator configured to generate an output power signal having a first voltage;
a controller configured to monitor and control at least one operational parameter of the generator; and
a buss potential isolation module configured to receive the power signal having the first voltage from the generator, reduce the first voltage to output a second voltage, and communicate the power signal having the second voltage to the controller,
wherein the buss potential isolation module includes a plurality of high impedance leads configured to reduce the output voltage having the first voltage level to the voltage having the second voltage level, and wherein the high impedance leads include spark plug lead wire.

27. A buss potential isolation module, comprising:
a housing defining an internal volume;
a voltage divider circuit disposed in the internal volume, the voltage divider circuit configured to receive a power signal having a first voltage from a generator, reduce the first voltage to output a second voltage, and communicate the power signal having the second voltage to a controller, the controller including electronic circuitry configured to operate at the second voltage,
wherein the generator includes an enclosure defining an internal volume and an opening defined on a sidewall of the enclosure, the voltage divider circuit comprising:
an input lead,
wherein, the housing is configured to be mounted on the sidewall of the enclosure such that input lead is disposed through the opening into the internal volume of the enclosure, the input lead configured to be electrically coupled to the generator, and
wherein the housing includes a conduit nipple, the conduit nipple configured to be disposed through the opening to allow the input lead to be communicated through the opening into the internal volume defined by the enclosure.

28. A buss potential isolation module, comprising:
a plurality of high impedance leads, the high impedance leads configured to receive a power signal having a first voltage from a generator, reduce the first voltage to output a second voltage, and communicate the second voltage to a controller or an external access terminal, the controller including electronic circuitry configured to operate at the second voltage, wherein the high impedance leads include spark plug leads.

* * * * *